(12) United States Patent
Palgrave-Moore et al.

(10) Patent No.: US 7,903,172 B2
(45) Date of Patent: Mar. 8, 2011

(54) SYSTEM AND METHOD FOR VIDEO PROCESSING

(75) Inventors: Edward Palgrave-Moore, Saffron Walden (GB); Keith Steward Hammond, Chelmsford (GB)

(73) Assignee: Snell Limited, Hampshire (GB)

( * ) Notice: Subject to any disclaimer, the term of this patent is extended or adjusted under 35 U.S.C. 154(b) by 737 days.

(21) Appl. No.: 11/091,951

(22) Filed: Mar. 29, 2005

(65) Prior Publication Data
US 2006/0221231 A1    Oct. 5, 2006

(51) Int. Cl.
*H04N 9/74* (2006.01)
*G06F 3/00* (2006.01)

(52) U.S. Cl. .......... 348/441; 348/584; 348/598; 715/723

(58) Field of Classification Search .................. 348/441, 348/584, 598; 715/723, 726; 386/52
See application file for complete search history.

(56) References Cited

U.S. PATENT DOCUMENTS

| | | | |
|---|---|---|---|
| 5,293,450 A * | 3/1994 | Kane et al. ............. 704/226 |
| 5,557,342 A * | 9/1996 | Eto et al. ............... 348/706 |
| 5,880,792 A * | 3/1999 | Ward et al. ............. 348/722 |
| 6,069,666 A * | 5/2000 | Lyons .................. 348/512 |
| 6,128,357 A * | 10/2000 | Lu et al. ................ 375/355 |
| 6,211,918 B1 * | 4/2001 | Uwabata et al. ........ 348/458 |
| 6,297,850 B1 * | 10/2001 | Han et al. .............. 348/521 |
| 6,437,834 B1 * | 8/2002 | Tagami ................. 348/705 |
| 6,532,042 B1 * | 3/2003 | Kim .................... 348/537 |
| 6,577,348 B1 * | 6/2003 | Park .................... 348/554 |
| 6,927,803 B2 * | 8/2005 | Toyama et al. ........ 348/586 |
| 7,019,788 B2 * | 3/2006 | Iizuka et al. .......... 348/584 |
| 7,030,932 B2 * | 4/2006 | Han, II ................. 348/554 |
| 7,061,540 B2 * | 6/2006 | Weaver et al. ......... 348/500 |
| 7,199,835 B2 * | 4/2007 | Takano et al. ......... 348/558 |
| 7,236,210 B2 * | 6/2007 | Iwase .................. 348/584 |
| 7,319,493 B2 * | 1/2008 | Hata et al. ............ 348/584 |
| 7,321,716 B1 * | 1/2008 | Vallone et al. ......... 386/68 |
| 7,400,359 B1 * | 7/2008 | Adams ................. 348/441 |
| 2004/0150752 A1 * | 8/2004 | Iwase .................. 348/584 |
| 2005/0046611 A1 * | 3/2005 | Safran et al. .......... 342/195 |
| 2006/0028584 A1 * | 2/2006 | Iizuka et al. .......... 348/584 |

* cited by examiner

*Primary Examiner* — Brian Yenke
(74) *Attorney, Agent, or Firm* — Pearl Cohen Zedek Latzer, LLP

(57) ABSTRACT

A video processing apparatus can receive video at two different rates, which may be High Definition video and Standard Definition Video. The input video is stored and read into a processor at a fixed internal rate for processing at that rate. Processed video is output to a further store from which it can be read at either of the input rates.

22 Claims, 2 Drawing Sheets

SYSTEM AND METHOD FOR VIDEO PROCESSING

FIELD OF THE INVENTION

The invention relates to a method and an apparatus for processing video data. In particular, the invention may relate to video processing in a video mixer.

BACKGROUND OF THE INVENTION

Video mixers are well known in the broadcast industry in both studio and outside broadcast environments and are used to synthesise a variety of program sources to generate program material. The program sources may be, for example: program material from different camera angles, for example at a football match or in a studio; clips from a clip store; or pre-recorded video material.

There are a number of different ways of combining the program sources to form the output program material. At the simplest, the output program material might be cut from one source, for example a live camera in a news studio, to second source, for example pre-recorded video material from an archive, which is relevant to current news story. In more complicated situations a fade or a wipe may be used to make a transition from one program source to another program source. In addition, a key source may be used to "cut through" a first program source and a second source may be inserted into the hole cut by the key. This technique allows effects such as displays of logos or sports match score boards, or picture-in-picture effects, to be achieved.

Therefore it can be seen that for many of the functions a video mixer is required to perform, the video mixer must combine picture information from more than one source to generate the output program material.

Established digital television standards are collectively termed Standard Definition (SD) television standards and currently a number of High Definition (HD) television standards have been developed. A major difference between SD and HD programming is that each HD picture has a far greater number of pixels, resulting in a higher data rate for processing.

Increasingly it is to be expected that a video mixer will be required to accept HD and SD program material as program sources and to produce both HD and SD program material.

SUMMARY OF THE INVENTION

The present invention seeks to alleviate the disadvantages of the prior art.

In accordance with a first aspect of the present invention, there is provided a video processing apparatus for processing video data conforming to one of a plurality of video standards at an internal rate independent of a standards data rate associated with the video data.

In accordance with a second aspect of the present invention there is provided a video processing apparatus for processing video data conforming to one of a plurality of video standards comprising: input storage for storing video data; video processor for reading stored video data from the input storage and processing the video data at an internal rate independent of the standards data rate; and output storage for storing processed video data generated by the video processor at an internal rate independent of the standards data rate.

In accordance with a third aspect of the present invention there is provided a method of processing video data conforming to one of a plurality of video standards comprising the step of processing the video data at an internal rate independent of a standards data rate associated with the video data.

In accordance with a fourth aspect of the present invention there is provided a method of processing video data conforming to one of a plurality of video standards comprising: storing video data in input video data storage; reading stored video data from the input video data storage; processing the video data at an internal rate independent of the standards data rate; and storing processed video data in output video data storage at an internal rate independent of the standards data rate.

In accordance with a fifth aspect of the invention there is provided a video processing apparatus comprising: a plurality of video processors for processing video data; and a router for routing video data between a first and at least a second of said plurality of video processors at an internal rate independent of a standards data rate associated with the video data.

Thus in accordance with the invention, the video data is processed at an internal rate independent of the standards data rate associated with the video data. This results in the video processor being able to process video data conforming to different standards easily. This feature is particularly advantageous in a video mixer for handling both standard definition and high definition television pictures simultaneously.

In accordance with another aspect of the invention video data may be transferred between video processors in a video processing apparatus at the internal rate independent of the standards data rate associated with the video data.

In the context of the invention, the standards data rate associated with the video data is intended to refer to the data rate generally associated with the standards format of the video data. This may generally be the gross pixel rate (and the equivalent serial data rate) associated with the total number of pixels per line, number of lines per frame and number of frames per second. Examples of these data rates are a 13.5 Mpixels/s data rate for standard definition pictures and a 74.25 Mpixels/s data rate for high definition pictures described herein.

It is intended that the term "video standard" covers both video data formats that have undergone a formalised standardisation process, and also de facto standard video data formats

BRIEF DESCRIPTION OF THE DRAWINGS

For a better understanding of the present invention, and to show how it may be brought into effect, reference will now be made, by way of example, to the accompanying drawings, in which.

DETAILED DESCRIPTION OF THE INVENTION

Figure 1:
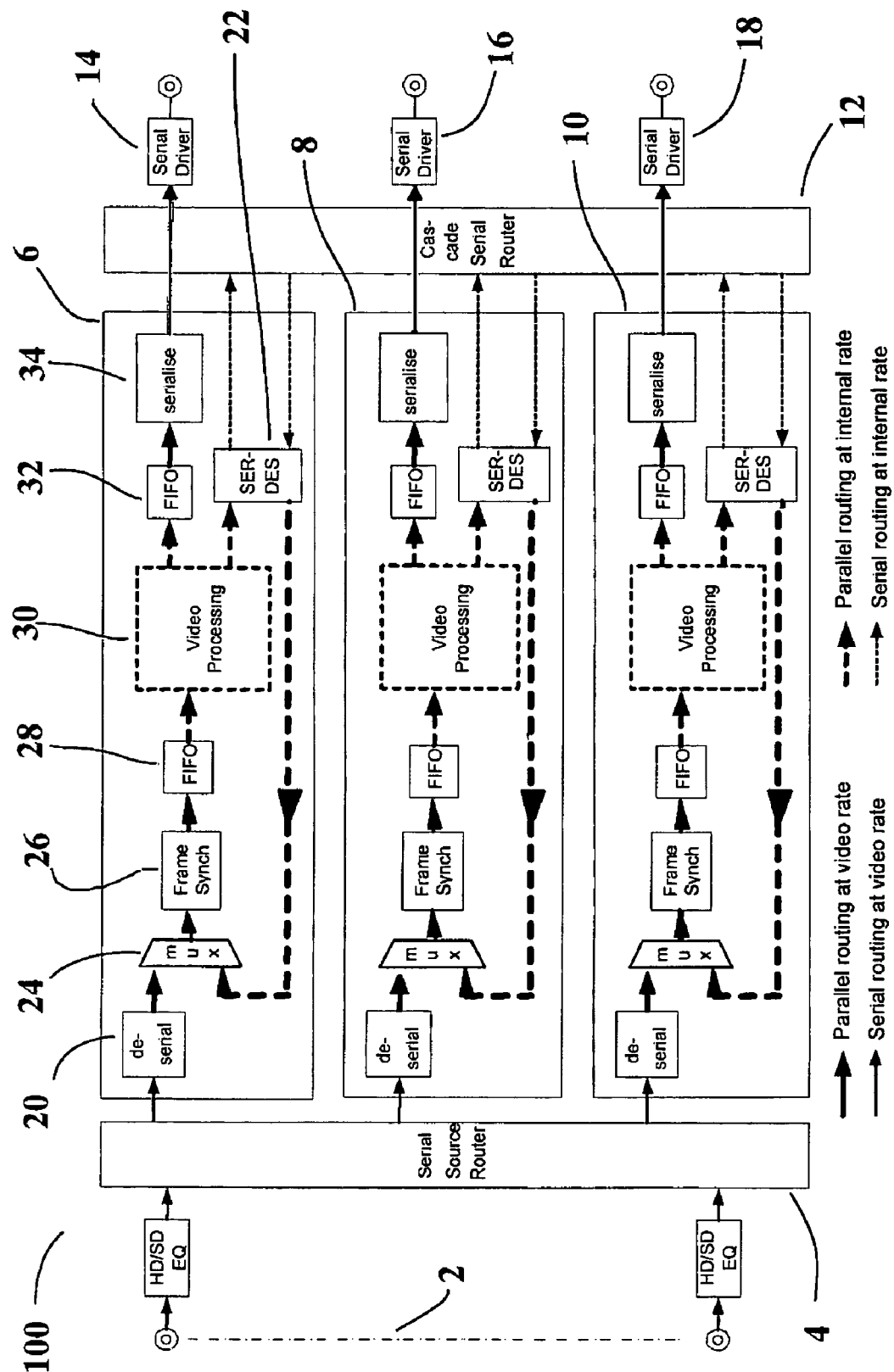
FIG. 1 is a block diagram of an exemplary video mixer.

Although an embodiment of the invention will now be described in the context of a video mixer, a person skilled in the art will appreciate that the invention may be applied to a wider range of video processing, and the invention is not intended to be limited to a video mixer.

An exemplary embodiment of the invention in the context of a video mixer will now be described with reference to FIG. 1. The person skilled in the art will recognise that FIG. 1 and the following description have been simplified and details of a video mixer not relevant to the present embodiment have been omitted from this description.

In particular, a skilled person will be aware that in order to combine different format pictures it is generally necessary to use interpolation to obtain a different number of pixels per line or a different number of lines per frame. In addition it may be necessary to change the frame rate of video data. This is not directly relevant to an understanding of the present invention, and therefore details of the interpolation and resizing of the video data have been omitted from this description.

The video mixer 100 is provided with a plurality of input video data equalisers (denoted collectively with reference numeral 2) coupled to a serial source router 4. The input video data equalisers 2 compensate for high frequency loss in input cables. The serial source router 4 is coupled to a number of mix effect (M/E) units 6, 8, 10 which in turn are also coupled to a cascade serial router 12. In addition, an output of each M/E unit 6, 8, 10 is also coupled to a serial output video data driver 14, 16, 18, respectively. Although in the exemplary embodiment three M/E units 6, 8, 10 are shown, it will be apparent to a skilled person that the number of M/E units in the video mixer 100 is not an essential feature and the video mixer 100 may have one or more M/E units, as selected by the skilled person.

The structure of an M/E unit in the exemplary embodiment will now be described with reference to M/E unit 6. In the exemplary embodiment the M/E units 6, 8, 10 are identical and so M/E units 8 and 10 will not be described in more detail.

M/E unit 6 has a deserialiser 20 and a serialiser/deserialiser (SERDES) 22 coupled to the serial source router 4 and the cascade serial router 12 respectively. The output of the deserialiser 20 and an output of the SERDES 22 are coupled to a multiplexer (MUX) 24 which is, in turn, coupled to a frame synchroniser 26, an input memory 28 and a video processor 30. An output of the video processor 30 is coupled via SERDES 22 to the cascade serial router 12. In addition, the or an output of video processor 30 is coupled via an output memory 32 and a serialiser 34 to the serial output video data driver 14.

As will be apparent to a skilled person, in practice the video processor 30 is generally supplied with a number of input signals that are combined to form the output video signal. Thus for example the video processor 30 might be supplied with a foreground signal, a background signal and a key signal that defines how the foreground and the background signals are to be combined. Thus in practice the M/E unit will have a plurality of inputs to the video processor 30, each input having associated therewith video data processing elements such as, but not limited to, a deserialiser 20; SERDES 22; multiplexer (MUX) 24; frame synchroniser 26; and input memory 28. For clarity, these additional elements have not been shown.

The video data signals combined in the video processor 30 may be video data signals external to the video mixer 100, or may be video data signals generated within the video mixer 100, such as outputs from other M/E units, still/clip stores, washes or Digital Video Effects (DVE) unit outputs.

Thus in operation of the video mixer 100, external video data is received at input video data equalisers 2 and supplied to serial source router 4. The serial source router 4 routes input video data intended for M/E unit 6 in serial format to deserialiser 20 and the deserialiser 20 converts the received video data from serial to parallel form. Internal video data intended for M/E unit 6 is received by SERDES 22 in serial form from an internal source, for example a still/clip store (not shown) or another M/E unit, via the cascade serial router 12. SERDES 22 converts the received video data from serial to parallel form.

The MUX 24 operates to select between internal and external sources for an input to the video processing section 30.

The frame synchroniser 26 operates to synchronise the video data selected by the MUX 24 with the frame timing of the M/E unit so that all inputs to the video processor 30 are frame synchronous. This enables cutting between or combination of the source video data by the video processor 30 to form the output. The provision of a frame synchroniser 26 is advantageous to avoid the need for an external synchroniser to be provided for asynchronous sources, for example, for remote external sources, since the timing of these sources relative to the frame timing within the M/E unit is not fixed. In addition, the frame synchroniser can perform image resizing or format conversion for internal sources, for example on a key layer internal source input.

The frame-synchronised video data is stored in input memory 28 at the video data rate and is subsequently read out from the input memory 28 by the video processor 30 for processing. This processing may typically involve the combination of video data from two or more sources to produce the output video data. The output video data may be stored in the output memory 32 prior to being converted back to serial video data in serialiser 34 and output to the serial output video data driver 14. The output video data may also be converted back to serial video data in SERDES 22 and output to the cascade serial router 12 to be routed to another M/E unit as an internal video data input.

In the illustrative embodiment of the invention, the external and internal video data may be SD format pictures or may be HD format pictures. As is well known, the number of pixels in a line and the number of lines in a frame depend upon the particular SD or HD standard being used. However, HD pictures will have a far larger number of pixels than SD pictures, and will therefore also have a higher data rate. Typically SD format pictures might have an overall pixel rate of 13.5 Mpixels/s, corresponding to a SD serial video data rate of 270 Mbit/s. In contrast HD format pictures might have an overall pixel rate of 74.25 Mpixels/s, corresponding to a HD serial video data rate of 1.485 Gbit/s.

However, in accordance with the invention, video processing is carried out at an internal rate that is independent of the data rate of the video data being processed, i.e. is independent of the format of the video data being processed. This internal rate is advantageously used both for the video processing rate and also for the internal video data transfer rate.

In the particular illustrative embodiment of the invention described above with reference to FIG. 1, the clock rate used by the video processing section is selected to be different from the standards data rate associated with any input video data. For example, the clock rate used by the video processing section is selected to be a clock rate greater than a standard definition standards data rate but less than a high definition standards data rate. However, it is not necessary for the internal rate to be different from all of the video data rates, in particular from the or a HD data rate. So, for example in the illustrative embodiment could use a HD data rate as the internal rate. However the use of a lower clock speed to set the internal rate results in some power saving, and may be advantageous. Advantageously, the clock rate selected enables all pixels of the digital active line to be processed during one line period.

In the illustrative embodiment, the cascade router path uses a data format similar to an HD serial data format (Society of Motion Picture and Television Engineers (SMPTE) 292M) running at the internal serial transfer rate.

Thus, as shown in the key at the bottom of FIG. 1, serial routing of the input video data from the input video data equalisers 2 via the serial source router 4 to the deserialiser 20 is carried out at the serial video rate (270 Mbit/s/1.485 Gbit/s for SD/HD in the exemplary embodiment) corresponding to the data rate associated with the format of the input video data. The deserialiser 20 converts the serial data into parallel data, as discussed above, and the parallel data is routed at the parallel video rate (13.5/74.25 Mpixels/s for SD/HD in the exemplary embodiment) associated with the format of the input video data to the input memory 28.

Video processor 30 uses an internal rate independent of the video rate for video processing. Thus the video processor 30 reads video data out of the input memory 28 at the parallel internal rate, processes the video data at the parallel internal rate, and stores the output video data in the output memory 32 at the parallel internal rate.

Output serialiser 34 reads the output video data from the output memory 32 at the output parallel video rate (13.5/74.25 Mpixels/s for SD/HD in the exemplary embodiment) associated with the output video data standard. The output serialiser 34 then converts the parallel video data into serial video data, as described above, at the serial video rate (270 Mbit/s/1.485 Gbit/s for SD/HD in the exemplary embodiment) corresponding to the format of the output video data.

In addition, internal routing is also done at the internal rate. Thus video data transferred internally by the cascade serial router 12, for example between M/E units or from a still/clip store, is transferred at the serial internal rate. Parallel data transferred to and from SERDES 22 is also transferred at the parallel internal rate.

In order to enable the video processing to be carried out at the internal rate independent of the video rate (which may vary) each line of video data is treated as a discrete data packet. Thus the video processor 30 receives a timing reference signal from which the video processor 30 can determine when to begin processing a line of video data. The timing reference signal will generally be related to the format or video standard of the desired output.

During processing of a line, typically video data from more than one source is processed at the internal rate in the video processor 30 to form the output video data. As indicated above, in the present exemplary embodiment the clock rate used by the video processing section is selected to be a clock rate greater than a standard definition standards data rate but less than a high definition standards data rate. When the internal rate is faster than the video rate, as in the case when processing SD video data in the present embodiment, the time taken for processing a line of data will be shorter than the active line time. However this is immaterial since the timing of processing of the next line is determined from the reference signal. When the internal rate is slower than the video rate, as in the case when processing HD video data in the present embodiment, the time taken for processing a line of data will be longer than the active line time. However, this is immaterial so long as the processing time is shorter than the total line time, since there is no requirement to process video data in the blanking period of a line. Again the timing of processing of the next line is determined from the reference signal.

As indicated above, advantageously the clock rate selected enables all pixels of the digital active line to be processed during one line period for the most pixel-processing demanding standard accepted by the video mixer 100. In this respect preferably the internal clock speed is selected to allow processing of the most demanding format pictures that the video mixer 100 is designed to accept, without changing the line rate. In the exemplary embodiment the internal clock speed is selected to allow processing of 1080i/60 (1080 lines; interlaced; 60 fields per second) HD format pictures without changing line rate.

Thus it can be seen that effectively the input memory 28 and output memory 32 referred to above compress and stretch the video lines between the pixel rate of the video standard at the input and output, and the internal clock.

Figure 2:
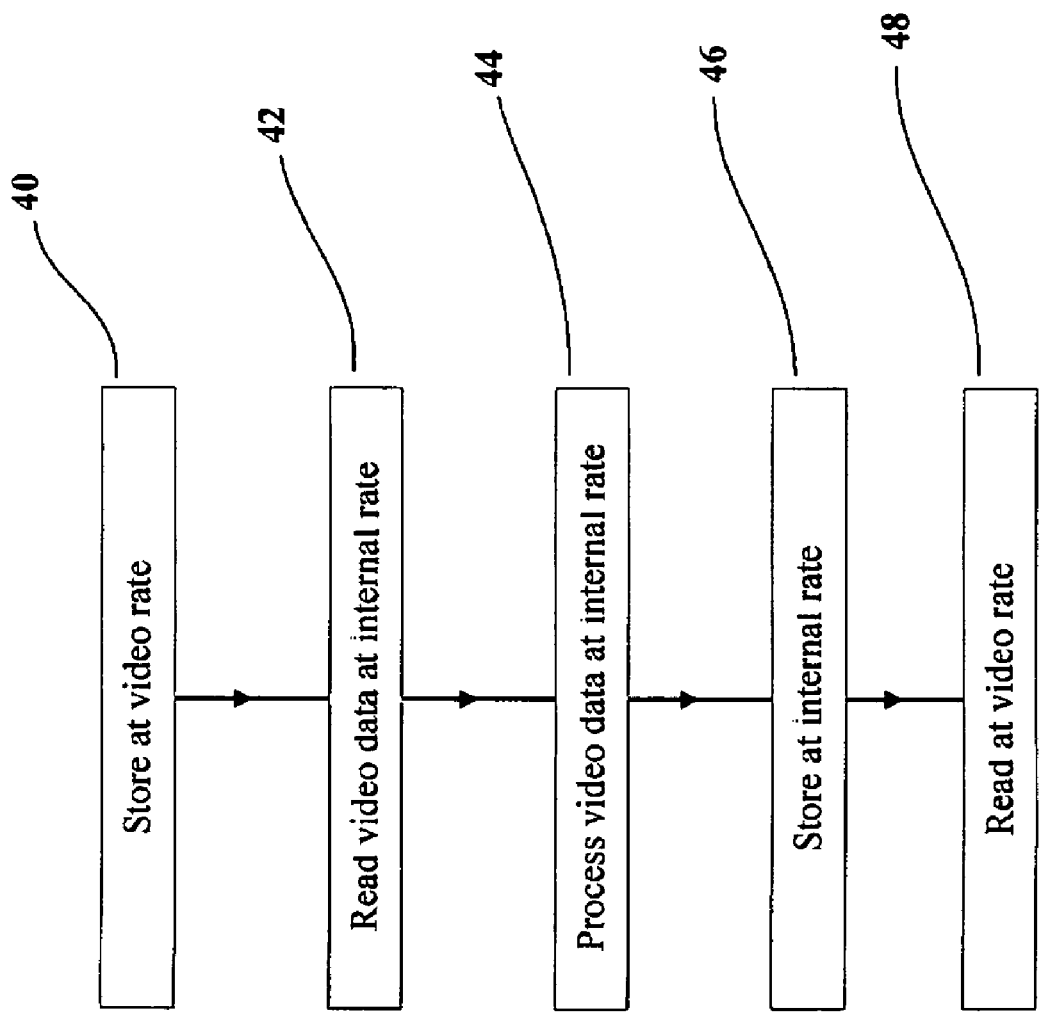
FIG. 2 is a flow chart illustrating video processing in accordance with an embodiment of the invention.

A video processing method in accordance with an embodiment of the invention will now be described with reference to FIG. 2.

Firstly, video data is stored, step 40, in the input memory 28. In the illustrated embodiment this may be input video data received from the input video data equalisers via the serial source router 4 or may be internal video data, for example from a clip store or another M/E unit. As described above, the externally-sourced input video data is stored at the video data rate associated with the video data standard, and the internally-sourced video data is transferred at, and therefore stored at, the internal data rate.

Then the stored video data is read out, step 42, and processed at an internal rate independent of a standards data rate associated with the video data, step 44. As discussed above, in accordance with the exemplary embodiment, in order to enable the video processing to be carried out at the internal rate independent of the video rate (which may vary) each line of video data is treated as a discrete data packet. Thus the steps of reading and processing the video data, steps 42, 44 would in the exemplary embodiment be carried out discontinuously on each line of video data. The timing between the start of the reading and processing of each line is determined by the timing reference signal described above, and will be related to the standards format of the output picture.

The output video data is then stored at the internal rate, step 46, in the output memory 32. Finally the video data is read out of the output memory 32 at the video data rate associated with the video standard of the output video data.

Clearly steps 46 and 48 are not necessary in the case of video data to be routed internally at the internal rate, for example via SERDES 22 to the cascade router 12.

In the described embodiment, the MUX 24 is positioned in front of the frame synchroniser 26, resulting in both external and internal sources being routed via the frame synchroniser 26. As indicated above, the frame synchroniser 26 ensures external sources are frame synchronised with the video mixer and also permits image resizing or reformatting for internal sources, for example on the key layers. However, as will be apparent to a skilled person, in general an internal source is not routed through the frame synchroniser 26. Therefore a multiplexer (not shown) may be provided between the frame synchroniser 26 and the input memory 28 to multiplex between frame synchronised external sources and internal sources, in addition to, or instead of, MUX 24 as shown.

Thus in general an external source passes through only one frame synchroniser independent of the number of M/E units it passes through in its path through the video mixer 100. The frame synchroniser operates at just over one frame delay, so the video delay is constant at just over one frame for all paths through the video mixer 100. The one frame delay is required when an image is scaled or has its format converted. This is a consequence of the vertical scanning of television, if the picture is moved upwards, the bottom cannot be output before it has arrived. In order to allow the output of one M/E unit to be used as an internal source for a second M/E unit, the timing of video processing in the M/E units 6, 8, 10 is staggered. The stagger in timing is accommodated by the input memory 28 and the output memory 32.

In the illustrated embodiment of the invention the input memory 28 and the output memory 32 are First In First Out (FIFO) memories. Thus video signal data stored in input FIFO memory 28 is read out of input FIFO memory 28 by the video processor 30 in the same order as it was stored. Similarly data stored in output FIFO memory 32 by the video processor 30 is read out of output FIFO memory 32 in the same order as it was stored. In addition, it will be apparent to a skilled person that input memory 28 and output memory 32 may be implemented as physically separate memories, or may be implemented as logically separate memories in the same physical memory.

Video processor 30 would generally be implemented as a dedicated video processor; however it would also be possible for the video processing functions described herein to be carried out by a suitable programmed general purpose computer.

A video mixer has been described that processes video data conforming to one of a plurality of video standards at an internal rate independent of a standards data rate associated with the video data. Thus, for example, in order to accept video data in a particular video standard, the control software merely reprograms the hardware with numbers relating to the number of pixels per line etc relating to the video standard: there is no need to reprogram programmable logic or to switch clocks, for example. This feature is particularly advantageous in a video mixer for handling both standard definition and high definition television pictures simultaneously.

While the present invention has been described herein with reference to the illustrative embodiment, the skilled person will understand that various modifications may be made without departing from the inventive concepts defined in the appended claims.

The invention claimed is:

1. Video processing apparatus for processing video conforming to at least a first and a second video standards, each video standard having a fixed standard number of frames per second and a fixed standard data rate, the first and second video standards having the same standard number of frames per second and respectively different standard data rates, the apparatus comprising
   input storage for storing video data, capable of being written to in each of a plurality of video standards; and
   a video processor for reading stored video data from the input storage and processing the video data at the standard number of frames per second and at an internal data rate which is greater than the standard data rate of the first video standard and less than the standard data rate of the second video standard, such that first video data written to the input storage in a first video standard can be processed in the video processor at the same internal data rate as second video data written to the input storage in a second video standard.

2. Video processing apparatus as claimed in claim 1 comprising a plurality of video processors, each video processor having input storage associated therewith, further comprising a cascade router coupled to the video processors and to the input storage, for routing internal video data output from one video processor to input storage associated with another video processor at the internal rate.

3. Video processing apparatus as claimed in claim 2, wherein the cascade router is a serial router, and further comprising a serialiser coupled between the output of a video processor and the cascade router, and a deserialiser coupled between the cascade router and the input to the video processor.

4. Video processing apparatus as claimed in claim 3 wherein the output data rate is different from the standards data rate of the data and/or the internal rate.

5. Video processing apparatus as claimed in claim 2 wherein the cascade router routes all internal data routed using a data format substantially similar to HD serial data format SMPTE 292M.

6. Video processing apparatus as claimed in claim 1 wherein the video processor reads and processes video data from the input storage line-by line in dependence on a reference signal.

7. Video processing apparatus as claimed in claim 1 wherein the input storage is a FIFO memory.

8. Video processing apparatus as claimed in claim 1, further comprising: output storage for storing processed video data generated by the video processor at an internal rate independent of the standards data rate; and output means for reading video data out of the output storage at an output data rate.

9. Video processing apparatus as claimed in claim 8, wherein the output storage is a FIFO memory.

10. Video processing apparatus as claimed in claim 1 wherein the internal rate is different from the standards data rate and/or the output data rate.

11. Video processing apparatus as claimed in claim 1 wherein the internal rate is sufficiently high that the processing time for the active line portion of a line of video data is shorter than the time interval between lines for all video data standards accepted by the video processing apparatus.

12. Video processing apparatus for processing video data conforming to at least a first and a second video standards, each video standard having a fixed standard number of frames per second and a fixed standard data rate, the first and second video standards having the same standard number of frames per second and respectively different standard data rates, the apparatus comprising:
   input storage for storing video data;
   video processor for reading stored video data from the input storage and processing the video data at the standard number of frames per second and at an internal data rate which is greater than the standard data rate of the first video standard and less than the standard data rate of the second video standard; and
   output storage for storing processed video data generated by the video processor at said internal data rate.

13. A video mixer comprising a video processing apparatus for processing video conforming to any one of a plurality of video standards, each video standard having a fixed standard number of frames per second and a fixed standard data rate, the plurality of video standards having the same standard number of frames per second and respectively different standard data rates, the apparatus comprising
   input storage for storing video data, capable of being written to in each of a plurality of video standards; and
   a plurality of video processors for reading, stored video data from the input storage and processing the video data at the standard number of frames per second and at an internal data rate independent of the standard data rate associated with the video data, such that first video data written to the input storage in a first video standard can be processed in the video processor at the same internal data rate as a second video data written to the input storage in a second video standard, the mixer being adapted to process simultaneously video conforming to at least two different standards.

14. A method of simultaneously processing video data conforming to a first video standard with video data conforming to a second video standard, each video standard having a fixed standard number of frames per second and a fixed standard data rate, the first and second video standards having the same standard number of frames per second and respectively different standard data rates, comprising the steps:

storing video data in video data storage in each of a plurality of video standards;
   reading stored video data; and
   processing in a video data processor the read video data at the standard number of frames per second and at an internal data rate which is the same for video data conforming to the first video standard as for video data conforming to the second video standard.

15. The method as claimed in claim 14 where the step of storing video data in video data storage comprises the step of storing video data at the standards data rate associated with the video data.

16. The method as claimed in claim 14 further comprising the step: routing video data output by the video data processor to a second video processor at the internal rate.

17. The method as claimed in claim 16 wherein the video data is routed to the second video processor in a serial data format.

18. The method as claimed in claim 17 wherein the video data is routed using a data format substantially similar to HD serial data format SMPTE 292M.

19. The method as claimed in claim 14 wherein the video processor reads and processes video data from the video data storage line by line in dependence on a reference signal.

20. The method as claimed in claim 14 further comprising the steps: storing processed video data generated by the video processor in output video data storage at an internal rate independent of the standards data rate; and reading video data out of the output storage at an output data rate.

21. The method as claimed in claim 20 wherein the internal rate is different from the standards data rate and/or the output data rate.

22. The method as claimed in claim 14 wherein the internal rate is sufficiently high that the processing time for the active line portion of a line of video data is shorter than the time interval between lines for all video data standards accepted by the video processing apparatus.

* * * * *